United States Patent [19]

Markow

[11] Patent Number: 4,673,014
[45] Date of Patent: Jun. 16, 1987

[54] RUN-FLAT TIRE INCORPORATING TAPE-WRAPPED HELICAL COIL BAND AND METHOD OF FORMING

[75] Inventor: Edward G. Markow, Oakdale, N.Y.

[73] Assignee: Grumman Aerospace Corporation, Bethpage, N.Y.

[21] Appl. No.: 741,921

[22] Filed: Jun. 6, 1985

[51] Int. Cl.$^4$ ............................................. B60C 17/00
[52] U.S. Cl. ................................. 152/156; 152/516; 156/110.1; 156/165
[58] Field of Search ............... 152/520, 516, 156, 533, 152/8, 9, 13, 261, 286; 767/167, 180; 156/144, 165, 126, 121, 117, 110.1

[56] References Cited

U.S. PATENT DOCUMENTS

| | | |
|---|---|---|
| 1,749,117 | 3/1930 | Weichsel . |
| 2,822,857 | 2/1958 | Rothermel et al. ............... 156/165 |
| 2,945,525 | 7/1960 | Lugli . |
| 3,142,598 | 7/1964 | Rosen . |
| 3,416,783 | 12/1968 | Tondato . |
| 3,449,199 | 6/1969 | Mead . |
| 3,568,286 | 3/1971 | Ross . |
| 3,730,244 | 5/1923 | Ross . |
| 3,734,157 | 5/1973 | Rogue . |
| 3,813,098 | 5/1974 | Fischer et al. . |
| 3,867,973 | 2/1975 | Cozzolino et al. . |
| 3,897,814 | 8/1975 | Grawey . |
| 4,011,899 | 3/1977 | Chamberlin . |
| 4,111,249 | 9/1978 | Markow ............................. 152/156 |
| 4,257,836 | 3/1981 | Beneze . |
| 4,260,143 | 4/1981 | Kliger . |
| 4,281,700 | 8/1981 | Ross . |
| 4,281,701 | 8/1981 | Ross . |
| 4,293,019 | 10/1981 | Maiocchi . |
| 4,414,049 | 11/1982 | Jones . |
| 4,422,627 | 12/1983 | Schmidt et al. . |
| 4,428,411 | 1/1984 | Markow et al. . |
| 4,459,167 | 7/1984 | Markow et al. .................... 156/165 |
| 4,464,216 | 8/1984 | Gardiner . |

*Primary Examiner*—Michael Ball
*Attorney, Agent, or Firm*—Pollock, VandeSande & Priddy

[57] ABSTRACT

A run-flat pneumatic radial tire is equipped with a prestressed helical coil which is positioned inside the tire crown radially inwardly of the tread thereof. The coil is wound to approximately 50 percent of its free diameter to prestress it and the outer surface has a resin-impregnated tape applied thereto. The tape serves to hold the coil in a predetermined condition while the taped coil is cured. The taped coil can be co-cured in situ with the tire or prepared in advance of tire fabrication.

4 Claims, 6 Drawing Figures

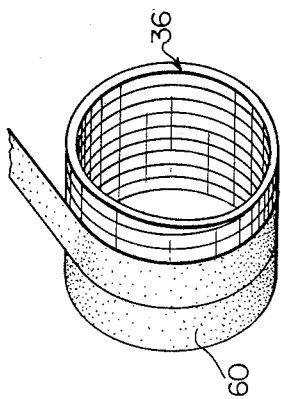
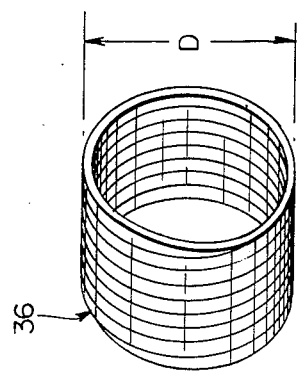
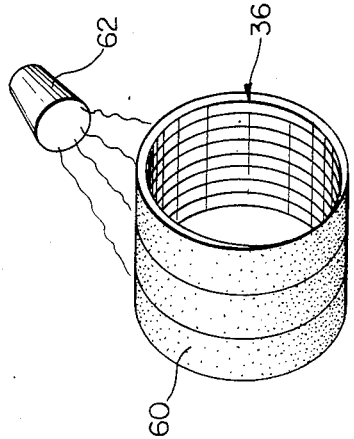
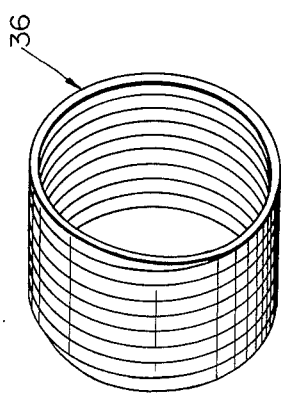

RUN-FLAT TIRE INCORPORATING TAPE-WRAPPED HELICAL COIL BAND AND METHOD OF FORMING

FIELD OF THE INVENTION

This invention relates to radial run-flat pneumatic tires and, more particularly, to a run-flat tire having a structural helical coil compression element inserted in the casing of the tire in the crown thereof, and to a method of making the same.

BACKGROUND OF THE INVENTION

An area of tire technology which has engaged investigators over the years is the run-flat pneumatic tire concept. A run-flat pneumatic tire is one designed to support a vehicle for operation even if the tire has partially or totally lost its inflation pressure. The advantages of such a tire in safety, convenience, cost, and weight and space saving are obvious. A recent successful development in the art of run-flat tires is the band-reinforced radial tire designed by the inventor of the present application, which banded tire is the subject of U.S. Pat. No. 4,111,249, granted to Edward G. Markow and assigned to the assignee of the present invention. The run-flat tire in the Markow patent is hereby incorporated herein by reference.

A banded run-flat tire is a pneumatic radial tire having a casing with a crown and sidewalls extending from the crown on either side to annular beads, which, in a conventional way, are used to mount the tire in a sealed relationship on the rim of a wheel. In the design the band element, which usually is a thin structural ring of high-strength steel or a fiber/epoxy composite, is incorporated circumferentially into the crown of the tire under the tread thereof. Radial tires, as is well known, have one or more plies containing a multiplicity of closely spaced radial reinforcing cords or wires in the sidewalls of the tire casing. In the tire disclosed in the above-referenced patent to Markow, the radial cords or wires function as spoke-like reinforcing elements to stabilize the circumferential band. When the tire is deflated, the radial spoke-like elements and the band stabilized thereby form a load-sustaining structure analogous to an elastic arch. In the design the band receives vertical, drag, and side loads from the road or ground surface and carries those loads in compression and bending; the radial spoke-like elements act as tension members to support the axle. A prime function, also, of the closely spaced radial elements is to stabilize the thin band against buckling.

BRIEF DESCRIPTION OF THE PRIOR ART

U.S. Pat. No. 4,428,411 and divisional U.S. Pat. No. 4,459,167, granted to the present inventor and assignee, are directed to a radial run-flat pneumatic tire having a casing with an annular compression element therein underlying the crown and sidewalls extending therefrom on either side to annular beads. A standard radial tire casing having one or more plies of radial textile cords or metal wires extending from bead to bead can be used for the tire. In that prior art design, the annular compression element in the crown of the tire is a helix with closely spaced coils, which helix is positioned inside the casing of the tire on the inside surface of the tire crown radially inwardly of the tread portion. In operation, the annular compression element cooperates with the radial elements in the tire sidewalls which act as individual tension spokes to provide load supporting strength such that the compression element is reinforced thereby. The compression element is a helix made by winding a solid or hollow rod of suitable cross-section on a cylinder. Variations in the lateral flexibility of the element can be attained by varying the size, configuration, or material properties of the axially outer coils with respect to the axially inner coils of the helix. In that prior art tire, the compression element can be installed in the tire during the tire manufacturing process. Installation of the compression element into the fire can be effected by winding up the helix to reduce its diameter such that it can be installed through the beads into the tire interior. Alternately, the end of an end coil of the helix can be separated from the other coils of the helix and introduced over the bead into the tire casing and the remaining coils can be fed into the casing by a relative rotation between the tire and the helix.

BRIEF DESCRIPTION OF THE PRESENT INVENTION

The present invention is an improvement over the helical coil band tire of the previously described prior art patent. In the present invention a free coil having a diameter approximately 50 percent larger than the finished tire is coated with an appropriate adhesive and placed on a suitable cylindrical mandrel so that it may be wound until its outer diameter is brought to a reduced desired size, prestressing the wound coil. Adjacent coils in the wound coil are maintained in close proximity or abutment with one another. With the wound coil retained in this condition, its outer surface receives a resin pre-impregnated tape which is tightly wound around the coil to completely overwrap the outer diameter of the wound prestressed coil. The resin is then cured and a band comprising a prestressed wound helical coil having an integral cylindrical outer sheath is produced. When the band is removed from the mandrel, it is ready to be installed into a run-flat tire carcass or be put to any other suitable use.

Alternatively, the final resin curing of the tape can be delayed until after the coil is suitably positioned in the carcass of a run-flat tire during the tire making process. The tire structure and the resin-impregnated coil can then be co-cured in situ.

The utilization of an overwrapping tape secures the individual windings of the coil thereby avoiding the necessity of specially forming the surfaces of each coil winding to effect interengaging coils as disclosed in the previously mentioned patents.

By utilizing the helical structure of the present invention, the band is prestressed in the direction of lowering the stress in a flattened footprint area of a tire, the area most vulnerable to road impact stresses. In addition, unlike the helical coil band disclosed in the previously mentioned patents, the present structure can be stocked and handled in exactly the same manner as conventional compression bands. In the alternate situation where the band is co-cured with the tire, substantial economies in manufacture can be realized by the co-curing step.

BRIEF DESCRIPTION OF THE FIGURES

The above-mentioned objects and advantages of the present invention will be more clearly understood when considered in conjunction with the accompanying drawings, in which:

FIGS. 3-6 disclose sequential steps in the formation of a resin-cured helical-coil band.

DETAILED DESCRIPTION OF THE INVENTION

Figure 1:
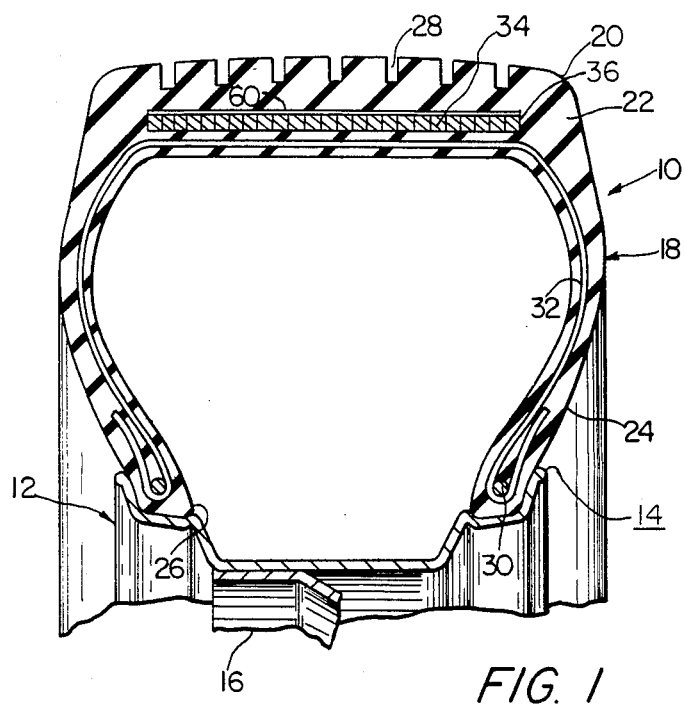
FIG. 1 is a sectional view of a tire in which a helical coil band of the present invention is installed.

Having now more particular reference to the drawings, FIG. 1 illustrates an embodiment of a tire 10 of the invention mounted on a wheel 12 which may be of a conventional type having a drop center rim 14 welded to a wheel body 16. Tire 10 comprises a carcass or casing 18 having an outer peripheral tread portion 20 in the crown 22 of the casing and sidewalls 24 extending from either side of the crown to beads 26 in the inside peripheral portions of the sidewalls. Grooves 28 in any desired pattern can be incised in tread portion 20 of the casing 18. Beads 26, which can be reinforced with the usual annular cords or wires 30, are adapted to seat in an airtight relationship in the rim 14 when the tire is mounted on the wheel 12. The sidewalls 24 and carcass of the casing are reinforced by the usual known weftless radial plies or elements 32. Radial elements 32 can be fabricated out of steel wires or suitable textile fibers as is well known in the art. When mounted on the wheel 12, tire 10 can be inflated through the usual valve (not shown in the figures) in the rim of the wheel.

Figure 2:
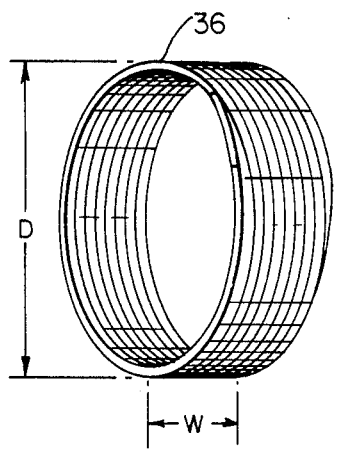
FIG. 2 is a perspective view of a helical compression element of a tire as employed in the present invention.

It will be recognized that the description to this point could apply to the usual radial tire. A run-flat capability is imparted to the radial tire by an annular structural helical coil compression element 36 (FIGS. 1, 2) in the crown 22 region of the tire underlying the tread radially outwardly of the carcass reinforcing plies. The compression element is preferably a multiple-coil helix of a high-strength material such as a suitable metal or reinforced plastic or composite. High strength, in the context of the materials used in the annular compression element, is understood to mean materials having a tensile strength in the range of about 150 ksi and over.

The helix 36 can be fabricated by a suitable protrusion or filament winding process to produce a suitable cross-sectional shape so as to impart a desired physical response to various operating conditions.

By wrapping a layer of resin-impregnated tape 60 (FIGS. 1, 5) over the windings of the helix 36, the helix is preformed prior to its insertion in a tire so that the bands may be stocked and handled in exactly the same manner as conventional compression bands.

FIGS. 3-6 illustrate one method for fabricating the helix of the present invention. In FIG. 3 a helix, formed by protrusion or filament winding techniques, is coated with an appropriate adhesive system and positioned on a suitable cylindrical mandrel (not shown) so that it may be wound in the direction of helix twist until the normal free outer diameter of the windings are reduced by approximately 50 percent to a desired diameter D, as shown in FIG. 4, prestressing the hexlix. Adjacent windings in the helix coil are in close proximity or abut one another. With the wound prestressed helix retained in this condition, its outer surface is suitably prepared to receive a resin-impregnated tape 60 which is tightly wound spirally, as shown in FIG. 5, around the helix to completely overlap or encapsulate the outer diameter of the helix and to lock in the prestress. In FIG. 6, a heat source 62 cures the resin of the tape which results in the formation of a band comprising a prestressed wound helix having an integral cylindrical outer sheath. When the band is removed from the mandrel, it is ready to be installed into a run-flat tire carcass or to be put to any other suitable use.

The above-described process is amenable to low-cost production wherein the tape 60 would overwrap an initial helix having a length substantially longer than would be finally incorporated in a single tire. After curing, as previously explained, it is possible to use a lathe cutting tool and spacing the cuts transversely along the axis of the helix so that individual sections of the long helix result, each having the required dimension in width for use in a separate tire.

In an alternate embodiment the helix wrapped in pre-impregnated tape can be positioned within a tire carcass before either have been cured. The heat normal to the rubber cure can be used to cure the helix in situ. The advantage of this approach is to avoid separate curing steps of the tire carcass and helix. Accordingly, production economies can be realized.

A major function of the compression element is to act in conjunction with the radial sidewall plies to thereby create a structure capable of supporting a full load even when the tire is unpressurized. When the tire is pressurized, the helix acts as a supple tensile member that contributes little or no influence on tire performance. However, when the tire is deflated, the helix is supported and stabilized by the radial sidewall elements such that the helix acts as a structural flexible-arch compression member which can support the unpressurized tire for operation under load.

It should be understood that the invention is not limited to the exact details of construction shown and described herein for obvious modifications will occur to persons skilled in the art.

What is claimed is:

1. A run-flat pneumatic tire comprising:
   a casing with a tread portion in the crown threreof and sidewalls extending from the crown;
   a prestressed helical coil having adjacently positioned windings located inside said casing, on the inside surface of the crown;
   a strip of tape wrapped around the exterior of the coil and bonded thereto for ensuring permanent retention of the coil in a prestressed condition;
   wherein the prestressing increases the fatigue life of said coil.

2. In a method for building a run-flat pneumatic tire having a casing with a tread portion in the crown thereof and sidewalls extending from the crown, the improvement comprising the steps:
   stressing a helical coil to a final diameter less than that of its free diameter;
   wrapping a strip of tape around the coil while the latter is in a stressed condition;
   allowing a bonding agent to contact the tape and the windings of the coil; and
   curing the bonding agent thereby permanently fixing the coil in a stressed condition; and
   locating the wrapped coil inside the crown of the tire.

3. The method set forth in claim 2 wherein the wrapped coil is co-cured with the tire casing during molding thereof.

4. The method set forth in claim 2 wherein the wrapped coil is cured separately of the tire carcass and bonded to the carcass after the carcass is cured.

* * * * *

UNITED STATES PATENT AND TRADEMARK OFFICE
CERTIFICATE OF CORRECTION

PATENT NO. : 4,673,014
DATED : June 16, 1987
INVENTOR(S) : Edward G. Markow

It is certified that error appears in the above-identified patent and that said Letters Patent is hereby corrected as shown below:

Column 2, line 12, change "fire" to --tire--.

Column 3, line 57, change "are" to --is--.

Column 3, line 59, change "hexlix" to --helix--.

Column 4, line 16, change "have" to --has--.

Signed and Sealed this

Sixteenth Day of February, 1988

Attest:

DONALD J. QUIGG

*Attesting Officer*  *Commissioner of Patents and Trademarks*